(12) United States Patent
Aita et al.

(10) Patent No.: US 6,377,602 B1
(45) Date of Patent: Apr. 23, 2002

(54) METHOD AND DEVICE TO FEED PREMIXED GAS TO TUYERES OF ELECTRIC ARC FURNACES

(75) Inventors: Bruno Aita, Buia; Fernando Clocchiatti, S. Daniele del Friuli, both of (IT)

(73) Assignee: Danieli & Officine Meccaniche SpA, Buttrio (IT)

( * ) Notice: Subject to any disclaimer, the term of this patent is extended or adjusted under 35 U.S.C. 154(b) by 0 days.

(21) Appl. No.: 09/600,896
(22) PCT Filed: Jan. 20, 1999
(86) PCT No.: PCT/IB99/00085
§ 371 Date: Jul. 24, 2000
§ 102(e) Date: Jul. 24, 2000
(87) PCT Pub. No.: WO99/37822
PCT Pub. Date: Jul. 29, 1999

(30) Foreign Application Priority Data

Jan. 23, 1998 (IT) .......................... UD98A0007

(51) Int. Cl.⁷ .................................. H05B 7/22
(52) U.S. Cl. ..................... 373/66; 373/72; 266/225; 75/10.19
(58) Field of Search ................. 373/2, 60, 66, 373/68, 72, 77, 85, 80, 22; 75/10.19, 10.22, 10.42; 266/225, 268, 47

(56) References Cited

U.S. PATENT DOCUMENTS

| 3,812,275 A | * | 5/1974 | Schemppt et al. ............ 373/66 |
| 3,902,889 A | | 9/1975 | Malin |
| 3,972,517 A | * | 8/1976 | Kraizinger et al. ......... 266/225 |
| 3,999,977 A | | 12/1976 | Kolb et al. |
| 5,557,631 A | | 9/1996 | Bulat ......................... 373/105 |
| 5,680,413 A | | 10/1997 | Ogushi et al. ................ 373/80 |
| 5,802,097 A | * | 9/1998 | Gensini et al. ............... 373/72 |

FOREIGN PATENT DOCUMENTS

| DE | 3806977 | 9/1989 |
| EP | 564432 | 10/1993 |
| EP | 625685 | 11/1994 |

OTHER PUBLICATIONS

Gaertner C.E., The Performance Of The Alarc–PC Post–Combustion Equipments Already in Use, Cahiers D'Informations Techniques De La Revue De Metallurgie, vol. 94, No. 4, Apr. 1997, pp. 437–443.

* cited by examiner

Primary Examiner—Tu Ba Hoang
(74) Attorney, Agent, or Firm—Antonelli, Terry, Stout & Kraus, LLP

(57) ABSTRACT

Method and device to feed tuyeres in an electric furnace, the tuyeres comprising a central conduit to deliver a comburent gaseous substance and a peripheral conduit to deliver a cooling gaseous substance, the method providing to send to the central conduit a comburent mixture consisting of oxygen and neutral gas ($N_2$, Ar, etc.) in defined percentages, the oxygen and the neutral gas being fed, for each of the tuyeres, to a mixing device with a high mixing capacity, at least the pressure of the neutral gas being able to be adjusted on the relative feed line so as to modulate the pressure of the mixture according to the characteristics of the melting process.

12 Claims, 3 Drawing Sheets

METHOD AND DEVICE TO FEED PREMIXED GAS TO TUYERES OF ELECTRIC ARC FURNACES

FIELD OF APPLICATION

This invention concerns a method to feed tuyères in electric furnaces, and the relative feed device, as set forth in the respective main claims.

The invention is applied in electric melting furnaces, and particularly in electric arc furnaces, to send a comburent mixture to the bottom tuyères provided in the hearth of the furnace.

The feed method according to the invention makes it possible to prolong the working life of the tuyères and improve the productivity thereof, reducing wear and deterioration and optimising efficiency.

The invention also makes it possible to increase the effect of the heat contribution which derives from the combustion of the substances inside the furnace and the comburent mixture delivered through the tuyères.

STATE OF THE ART

In electric melting furnaces, whether they be fed with direct or alternating current, the state of the art covers the use of tuyères on the bottom through which gassy substances with a high comburent power are introduced inside the furnace, with the function of determining and intensifying combustion reactions with the chemical substances which are liberated inside the furnace.

These combustion reactions make it possible to recover the intrinsic potential of energy possessed mainly by carbon and other chemical substances liberated inside the furnace by means of an exothermic oxidation reaction.

These combustion reactions supply an auxiliary contribution of energy with respect to the main means which the furnace, thus allowing a great saving in energy, speeding up the melting cycles and improving the quality of the metal produced.

The tuyères normally comprise a conduit, with its mouth protruding inside the furnace, connected to means to feed the comburent substance, normally oxygen or air enriched with oxygen.

Other gassy substances may also be sent through this conduit, such as azote, neutral gases or other similar substances, but one gas must always be separate from the other.

The gassy substance sent through the tuyères also has the function of stirring the bath of liquid metal.

In order to reduce wear on the upper part of the tuyère which protrudes into the furnace—wear caused by the enormous overheating due to the combustion reactions—the state of the art provides to send a cooling gas, normally a mixture of hydrocarbons, azote, inert gases or similar, together with the comburent gas.

There have been proposals for tuyères wherein, peripherally to a central conduit which delivers the comburent substance, an annular conduit is provided which introduces the cooling mixture.

The present Applicant, in the European Patent application EP-A-625685, described a tuyère wherein the oxygen-delivery conduit is made of copper and is obtained by making a central hole in a polygonal or star-shaped profile, the slits obtained at the side of the central hole being used to send the cooling mixture.

The said patent application also describes how the melting cycle is divided into a plurality of intervals, each of which is characterised by specific parameters of pressure both of the comburent oxygen and also of the cooling mixture.

Moreover, the feed method of EP'685 provides to regulate the pressure of the oxygen by using suitable readers and transducers on the line of feed.

The consequent variations in the flow of oxygen influence the flow of at least one of the components of the cooling mixture, the flow of the other component or components of the cooling mixture consequently varying so as to ensure a constant and controlled feed to the mixing device which supplies the cooling mixture to the annular delivery conduits inside the furnace.

By using this adjustment technique, together with the particular conformation of the tuyères, their size and their specific distribution on the bottom of the furnace, excellent results have been obtained in terms of energy efficiency and the protection of the tuyères from wear and deterioration.

However, in practice, it has been seen that in the event that heavy material of a certain thickness is deposited above the outlet mouth of the tuyères, the comburent gassy substance is not able to perforate this and therefore the tuyère rapidly deteriorates and is ruined.

This problem means that it is soon necessary to carry out maintenance operations or to replace the tuyères, which means interrupting the cycle, long down-times and a great deal of work for the workers.

These problems also cause periods when the tuyères are working at low efficiency, with a consequent reduction in the energy supply and a deterioration in the quality of the molten metal produced.

The present Applicant has designed, tested and embodied this invention to overcome the shortcomings of the state of the art, and to obtain further advantages.

DISCLOSURE OF THE INVENTION

The invention is set forth and characterised in the respective main claims, while the dependent claims describe variants of the idea of the main embodiment.

According to the invention, the central conduit of each tuyère is fed with a mixture consisting of oxygen and a neutral gas such as azote or similar.

These two components are sent to a mixing device through relative lines comprising at least means to modulate the sending pressure.

According to a variant, the line to feed the neutral gas comprises at least two send lines each of which defines a specific level of pressure at inlet.

The second send line makes it possible to obtain an oxygen-neutral gas mixture under pressure.

According to the invention, the mixing device which feeds the central conduit of the tuyère is of the type which is suitable to create an increase in the speed of the gas at inlet, so that at outlet the jet of the mixture has a kinetic energy able to perforate at least partly any possible layer of material which has accumulated on the bottom.

According to a variant, the mixing device is of the type which is suitable to induce a high quantity of vortical motion in the mixture of comburent substances at outlet.

The present Applicant has verified that by using the mixture with the aforesaid components, and using a mixing device which develops a high speed and in the gases at outlet, it is possible to prolong the working life of the tuyères.

According to another variant, the feed line of the cooling mixture provides at least a mixing system of a type which will achieve high speed and vortical motion at outlet.

ILLUSTRATION OF THE DRAWINGS

The attached Figures are given as a non-restrictive example and show a preferential embodiment of the invention as follows:

FIG. 1 shows a diagram of the feed device according to the invention for the comburent mixture sent to the central conduit of the tuyère;

FIG. 2a shows in cross section a possible mixing device applied to the device in FIG. 1;

FIG. 2b shows a view from "A" of FIG. 2a.

FIG. 3 shows a cross-sectional view of a tuyere described in Applicants' European Patent Application EP-625685.

DESCRIPTION OF THE DRAWINGS

With reference to the attached Figures, the reference number 10 denotes the device according to the invention employed to feed the comburent mixture to the tuyères in electric arc furnaces.

The device 10 is used in association with tuyères of the type including a central conduit to deliver the comburent mixture and peripheral or annular conduits through which a gassy cooling mixture passes.

Figure 1:
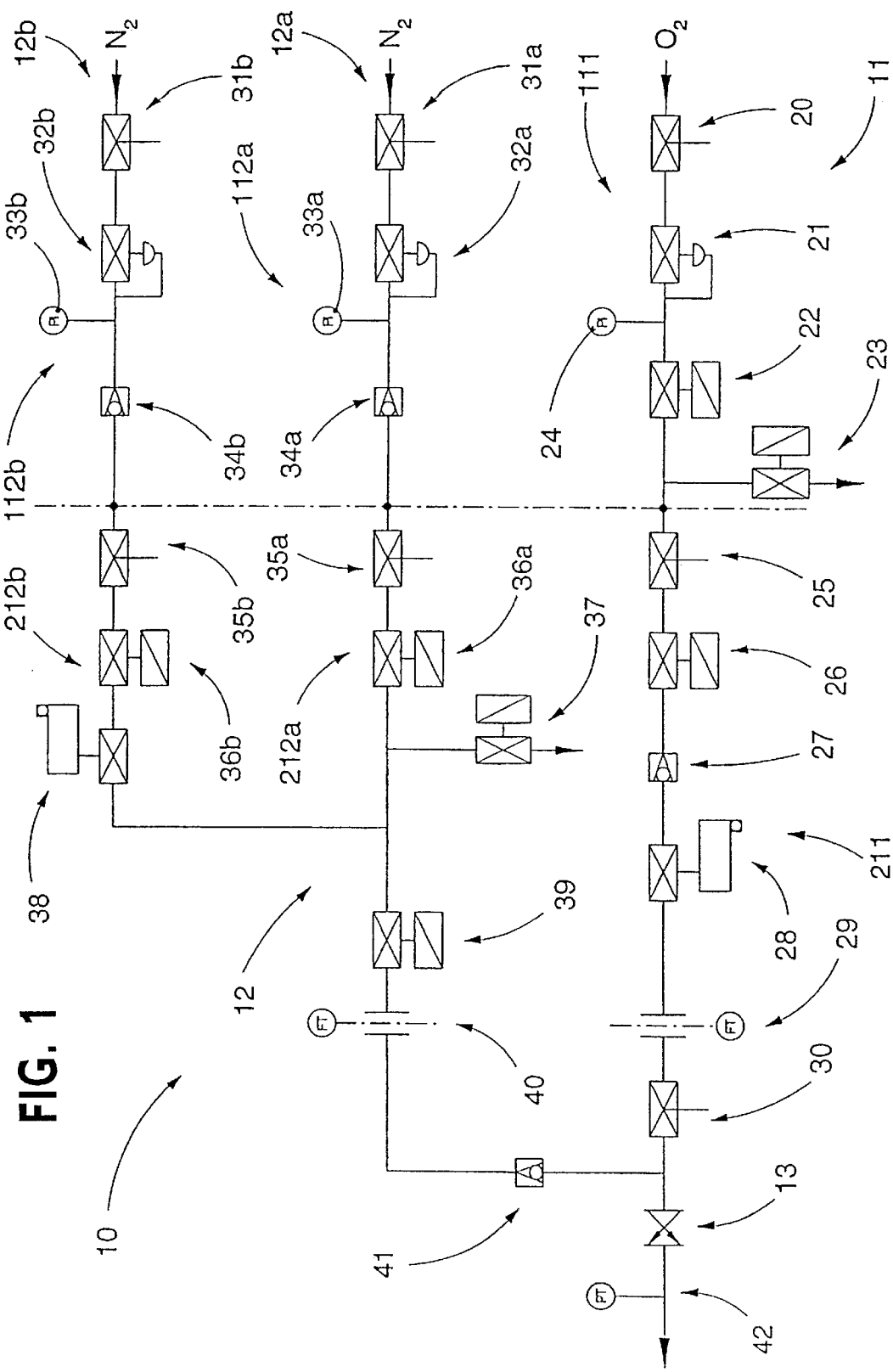

The device 10 therefore acts in cooperation with a device to mix and feed cooling gases which is not shown here and of a type substantially already known to the state of the art.

The device 10 according to the invention feeds the central conduit of the tuyères with a comburent mixture formed of oxygen ($O_2$) and neutral gas ($N_2$, Ar, etc.) and comprises, in this case, a line to feed oxygen 11 and a line to feed neutral gas 12 with a double sending branch, the first branch 12a and the second branch 12b, each of which defines a relative level of pressure at inlet.

The two sending branches 12a, 12b are selected singly according to the desired pressure of the comburent mixture which is to be obtained.

In this case, the second sending branch 12b of the line to feed neutral gas 12 makes it possible to obtain a comburent mixture with a greater pressure (about 7 bar) than that obtained with the first sending branch 12a, which gives a comburent mixture with a pressure of about 3 bar.

This circuit with two branches 12a and 12b also makes it possible to modulate the pressure of the neutral gas within a wider range than the two values mentioned above, using both inlets and modulating the flows so as to mix the gases at different pressures, thus obtaining intermediate pressures between the two original pressures.

The feed lines 11 and 12 are associated at their terminal ends to a mixing device 13 achieving the mixture of oxygen and neutral gas before they are sent to the tuyères.

Figure 2A:
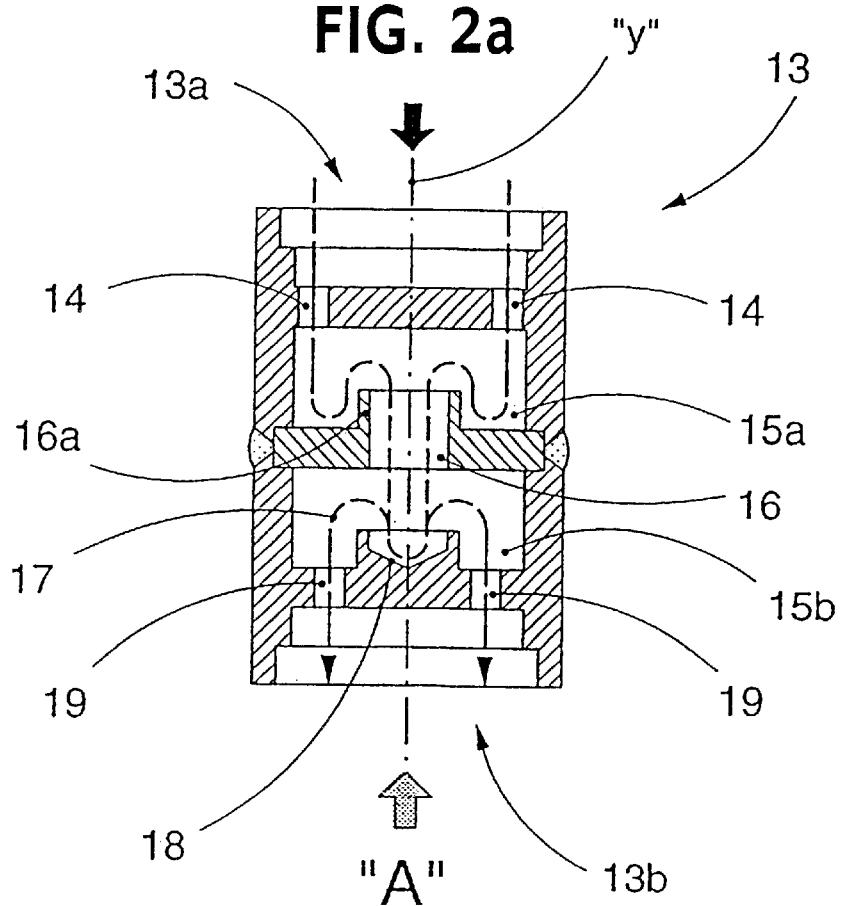
Figure 2B:
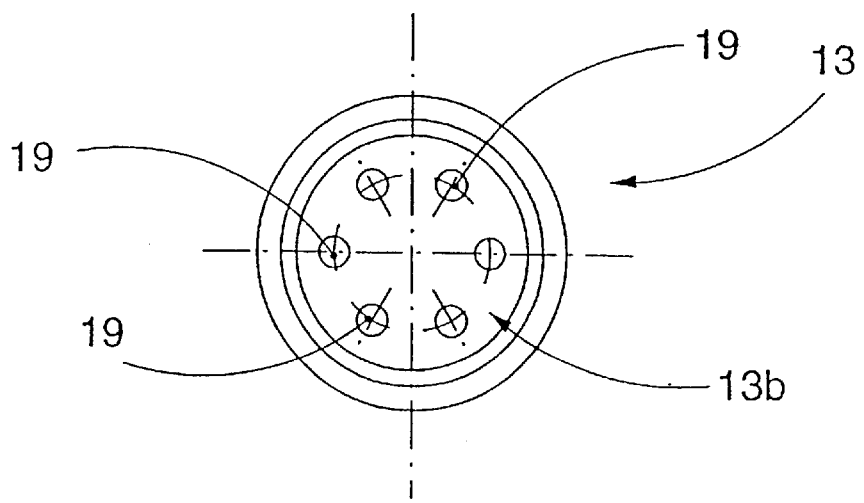
Figure 3:
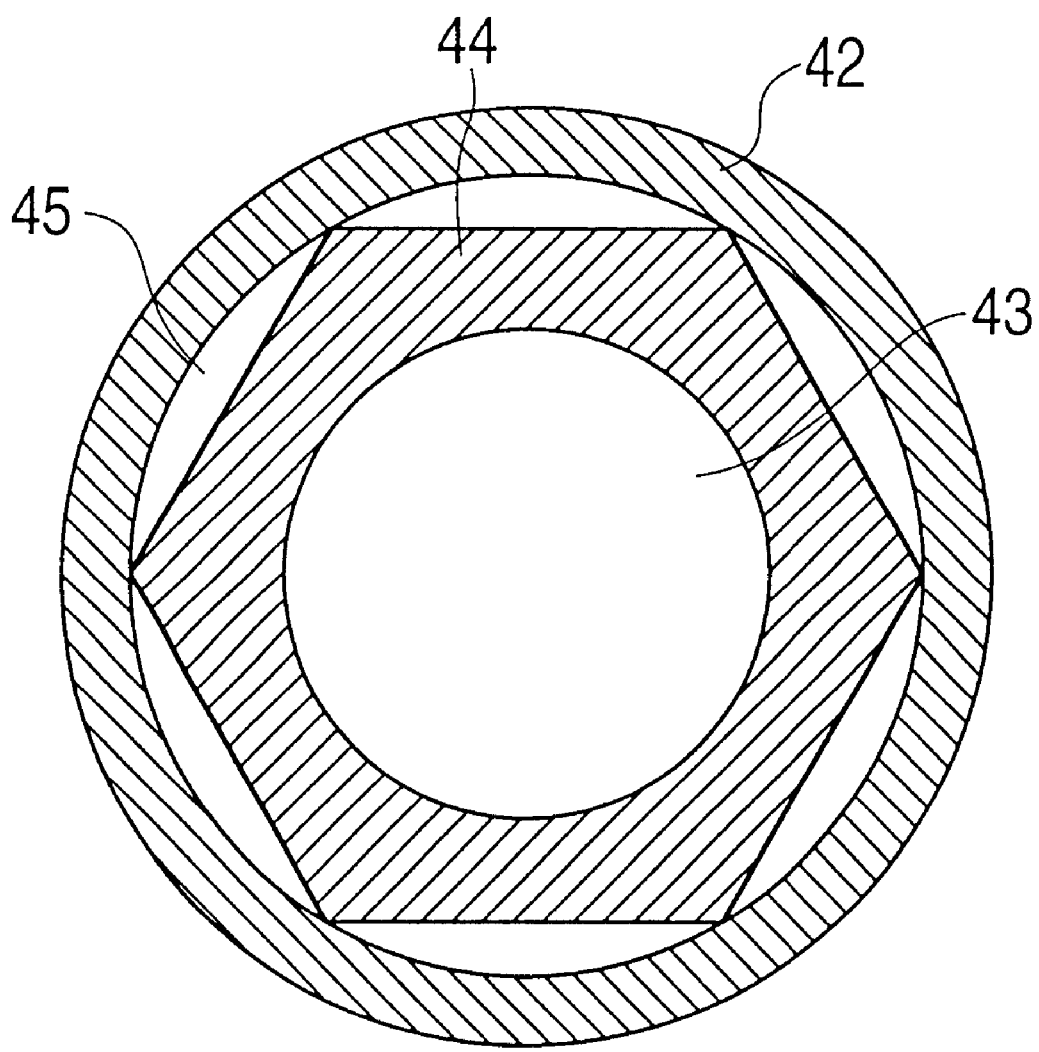

FIGS. 2a and 2b show a possible mixing device 13 employed by the device 10 according to the invention.

On the inlet side 13a, the mixing device 13 includes a plurality of inlet holes 14, of limited section, arranged on the periphery of the longitudinal axis "y", by means of which the oxygen and neutral gas enter into a first inner seating 15a at a speed which is already greater than the inlet speed.

The first inner seating 15a communicates with a second inner seating 15b by means of an axial channel 16 with a raised edge 16a.

At its centre, and therefore in a position substantially aligned with the axial channel 16, the second inner seating 15b has a conical hollow 18 and on the periphery a plurality of delivery holes 19, in this case six in number, arranged on the outlet side 13b of the mixing device 13.

The limited-section delivery holes 19 cause a further acceleration and a high vortical motion in the mixture obtained at it emerges.

This conformation of the mixing device 13 therefore causes vortical flows 17 of oxygen-neutral gas to form, thus ensuring an efficient mixing and a thorough mingling of the two gases.

This makes it easier to perforate any material possibly obstructing the outlet mouth of the tuyères and increases the efficiency and the delivery of energy of the tuyères.

According to a variant which is not shown here, the mixing device 13 is of the type which is suitable to generate at outlet an even greater vortical motion in the comburent mixture delivered.

The line to feed oxygen 11 and each of the two sending branches 12a and 12b comprise an initial segment, respectively 111, 112a and 112b, which is common to all the tuyères and a final segment, respectively 211, 212a and 212b, which develops parallel for each individual tuyère.

In this case, in its initial segment 111, the line to feed oxygen 11 includes in series a manual valve 20, a pressure regulator 21 cooperating with a manometer 24, a servo-commanded valve 22 and a discharge valve 23.

The final segment 211 of the line to feed oxygen 11 comprises, in series and for each tuyère, a manual valve 25, a servo-commanded valve 26, a non-return valve 27, a regulator valve 28, a flow meter 29 and a manual valve 30 located upstream of the mixing device 13.

Each of the initial segments 112a and 112b of the sending branches 12a, 12b of the line 12 to feed the neutral gas comprise, arranged in line, a manual valve, respectively 31a and 31b, a pressure regulator, 32a and 32b, a manometer, 33a and 33b, and a non-return valve, 34a and 34b.

In both the final segments 212a and 212b, for each tuyère there is a manual valve, respectively 35a and 35b, arranged upstream of a mating servo-commanded valve 36a and 36b.

The final segment 212a of the first branch 12a also includes a discharge valve 37, while the final segment 212b of the second branch 12b comprises a regulator valve 38.

The part shared by the two sending branches 12a, 12b of the line 12 to feed the neutral gas includes in series a servo-commanded valve 39, a device to measure the flow 40 and a non-return valve 41.

In a preferential embodiment of the invention, the device 10 is governed by a control unit by means of which, by setting certain parameters concerning the comburent mixture to be obtained, and the delivery times thereof, the activation cycles of the feeding lines 11 and 12 are automatically controlled so as to obtain a comburent mixture with the desired chemical/physical characteristics.

This setting of the parameters can also be determined by the control unit according to the characteristics of the melting cycle, the raw material, the quality of the steel to be obtained, etc.

The automatic control of the feeding lines 11 and 12 makes it possible, for every interval in the melting cycle, to regulate the pressure at which the gasses are sent to the mixing device 13, and also the relative flow, so that characteristics of energy supply can be maximised according to the specific melting process which is being carried out in the furnace.

What is claimed is:

1. Method to feed tuyeres in an electric furnace to carry out a melting process, the tuyeres comprising a central conduit to deliver a comburent gaseous substance and a peripheral conduit to deliver a cooling gaseous substance, the method comprising feeding oxygen and neutral in defined percentages to a mixing device with a high mixing capacity, adjusting at least a pressure of the neutral gas so as to modulate a pressure of the mixture according to characteristics of the melting process, and sending a comburent mixture comprising the oxygen and neutral gas in defined percentages to the central conduit for each of the tuyeres.

2. Method as in claim 1, wherein the neutral gas is fed through at least two lines, a first low-pressure line and a second high-pressure line.

3. Method as in claim 2, wherein the at least two lines are used selectively and alternatively.

4. Method as in claim 2, wherein the at least two lines are used contemporaneously and a percentage flow of each of the at least two lines being regulated so as to obtain a range of intermediate pressures between a high and low pressure of each of the at least two lines.

5. Method as in claim 2, wherein the second high-pressure line delivers neutral gas at 7 bar.

6. Method as claim 2, wherein the first low-pressure line delivers neutral gas at 3 bar.

7. Device to feed a comburent gaseous substance to a tuyere for an electric furnace, the device being comprising at least a line to feed oxygen and at least a line to feed neutral gas, the line to feed oxygen and at least a line to feed neutral gas being connected downstream to a mixing device with a high mixing capacity, arranged immediately upstream of the tuyere, each of the line to feed oxygen and at least a line to feed neutral gas comprising at least means to modulate and stabilize a pressure of delivery.

8. Device as in claim 7, which comprises at least two lines to feed the neutral gas, a high-pressure line and a low-pressure line which converge at a position upstream of the mixing device.

9. Device as in claim 8, which comprises means to autonomously regulate the flow of the at least two lines to feed neutral gas according to a desired modulation of pressure of the neutral gas supplied to the mixing device.

10. Device as in claim 7, wherein the mixing device is of the type suitable to generate a high speed and vortical motion of the comburent gaseous substance delivered.

11. Device as in claim 7, which comprises a control unit which regulates at least flow and pressure of the comburent gaseous substance according to the raw material and the quality of the steel to be produced.

12. Method as in claim 1, wherein the neutral gas is selected from the group consisting of $N_2$ and Ar.

* * * * *